Patented Oct. 3, 1950

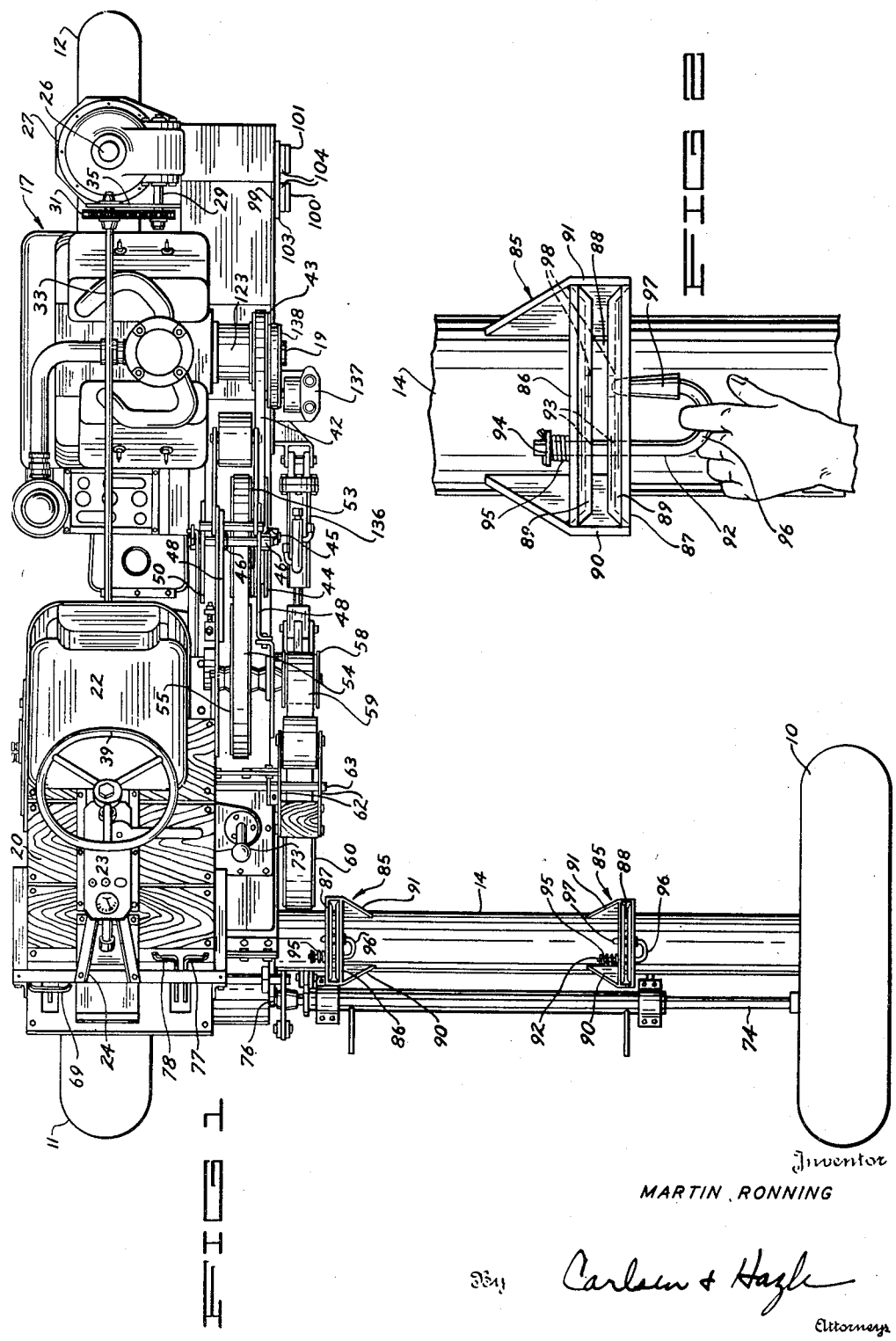

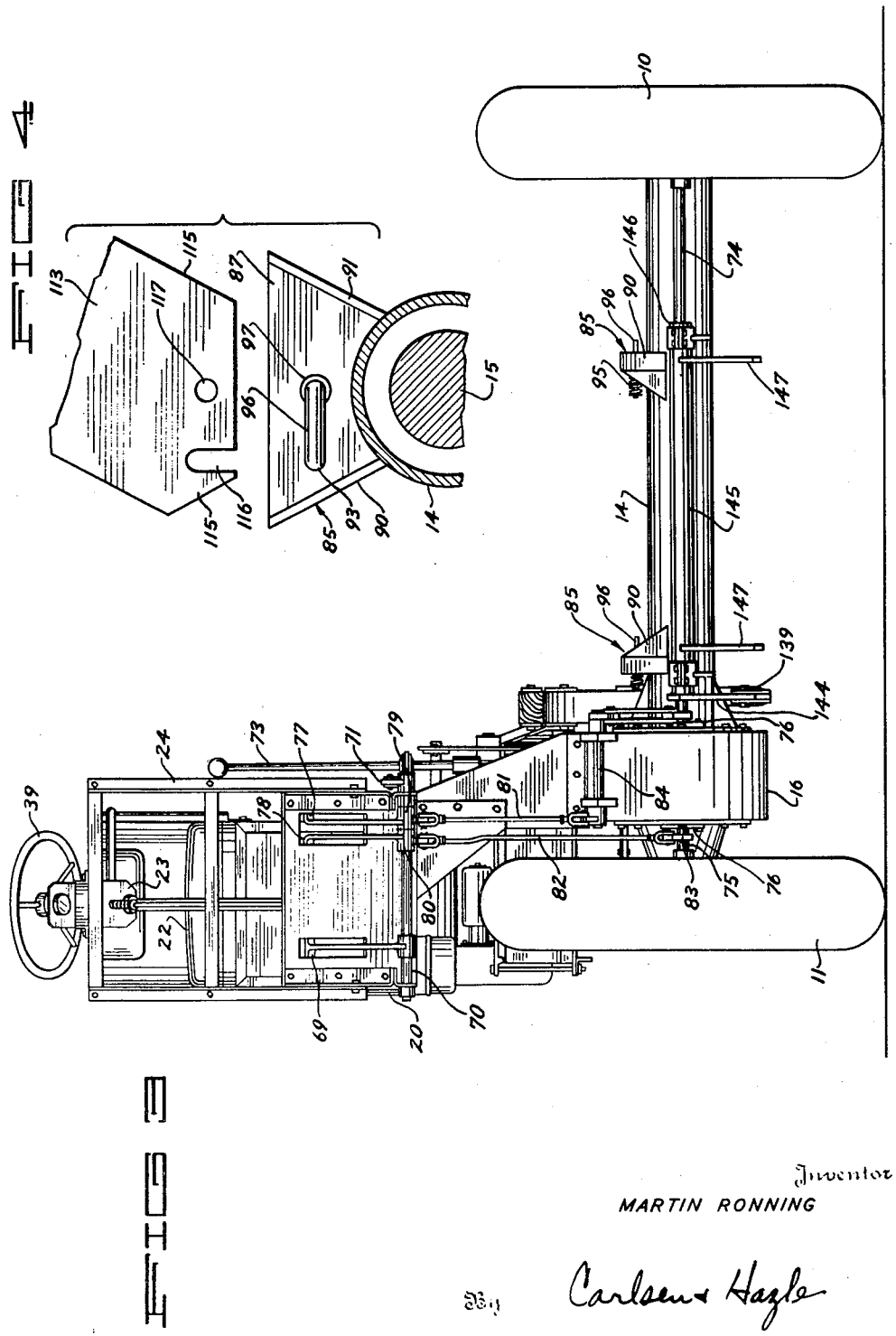

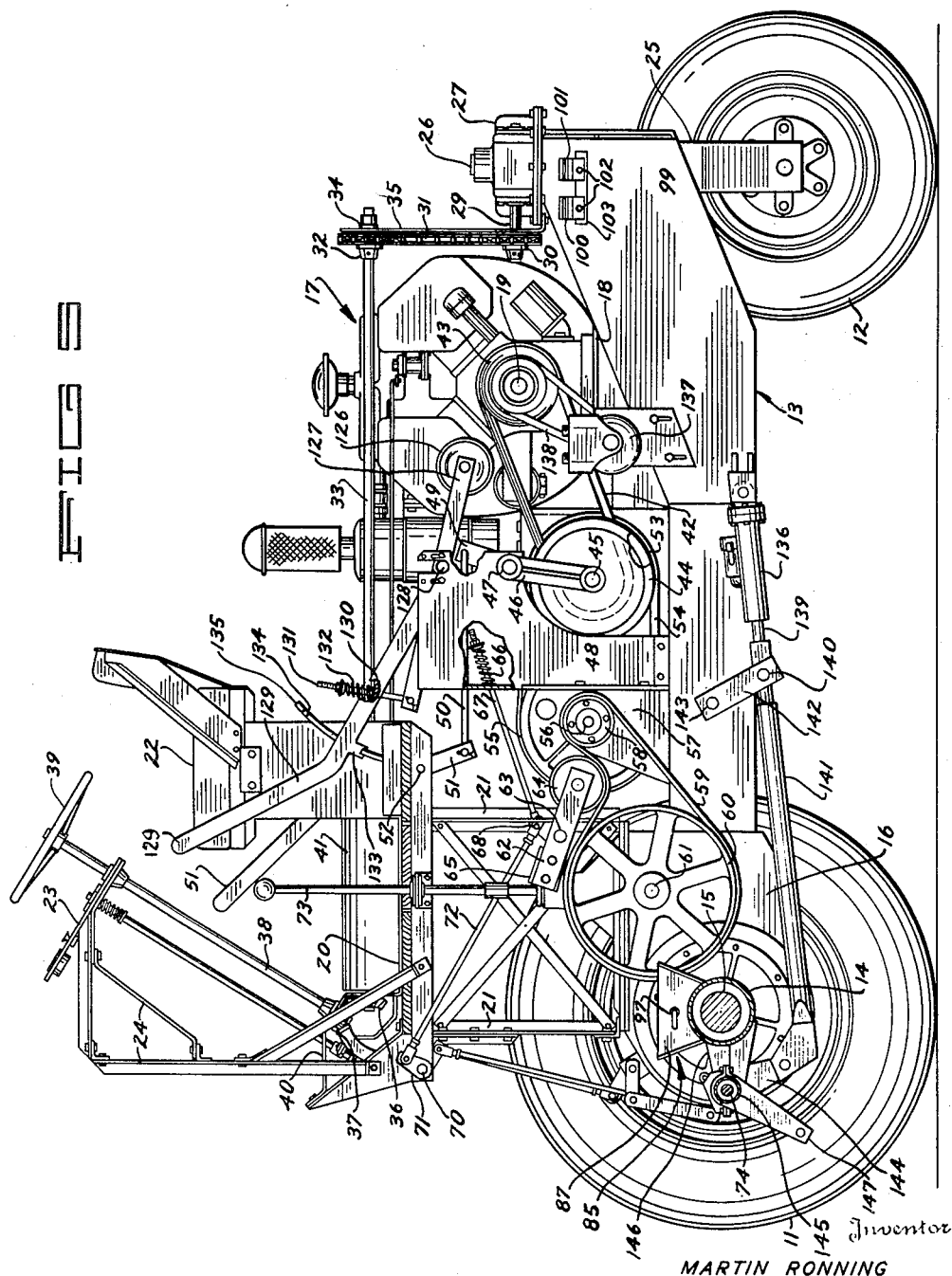

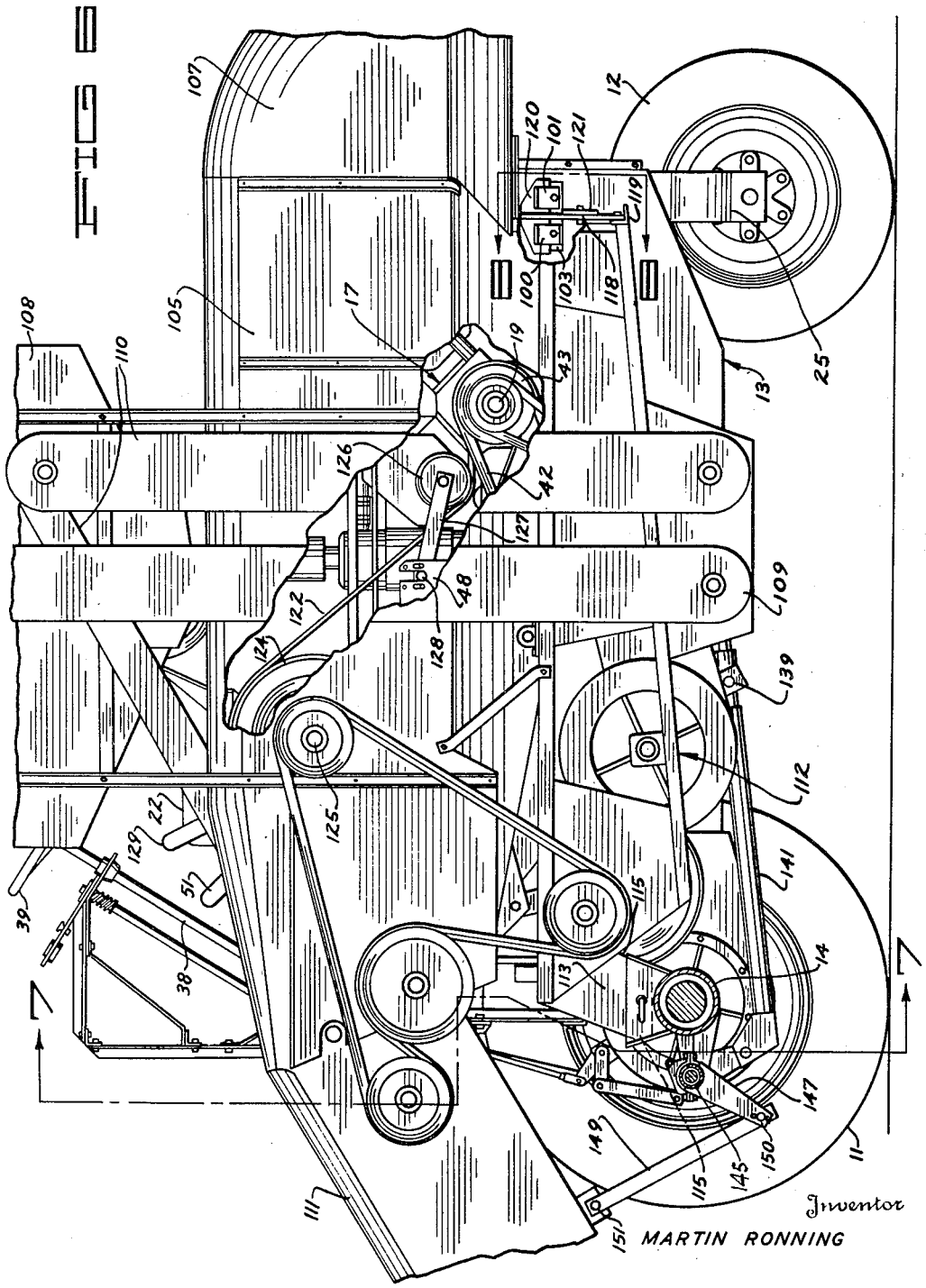

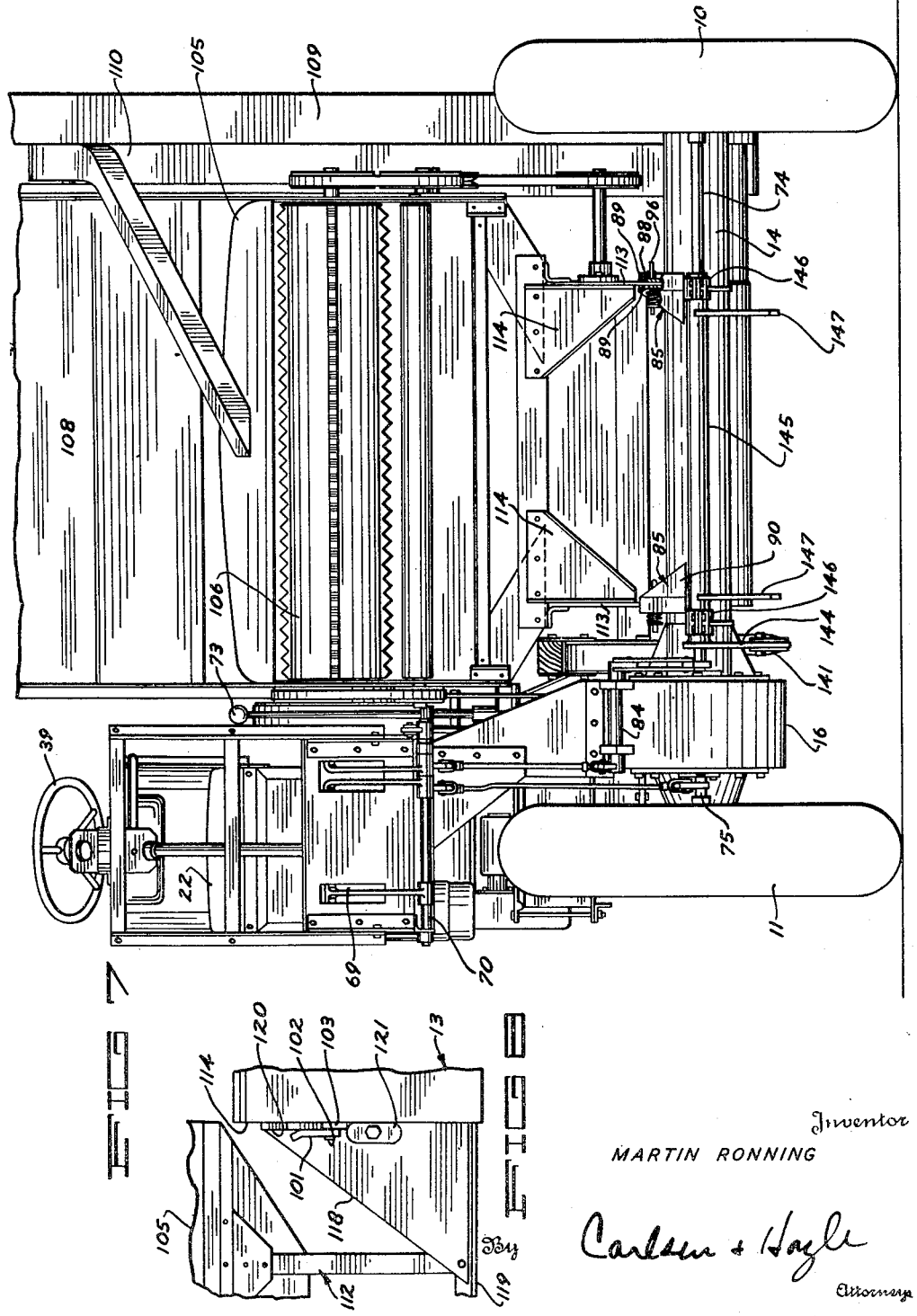

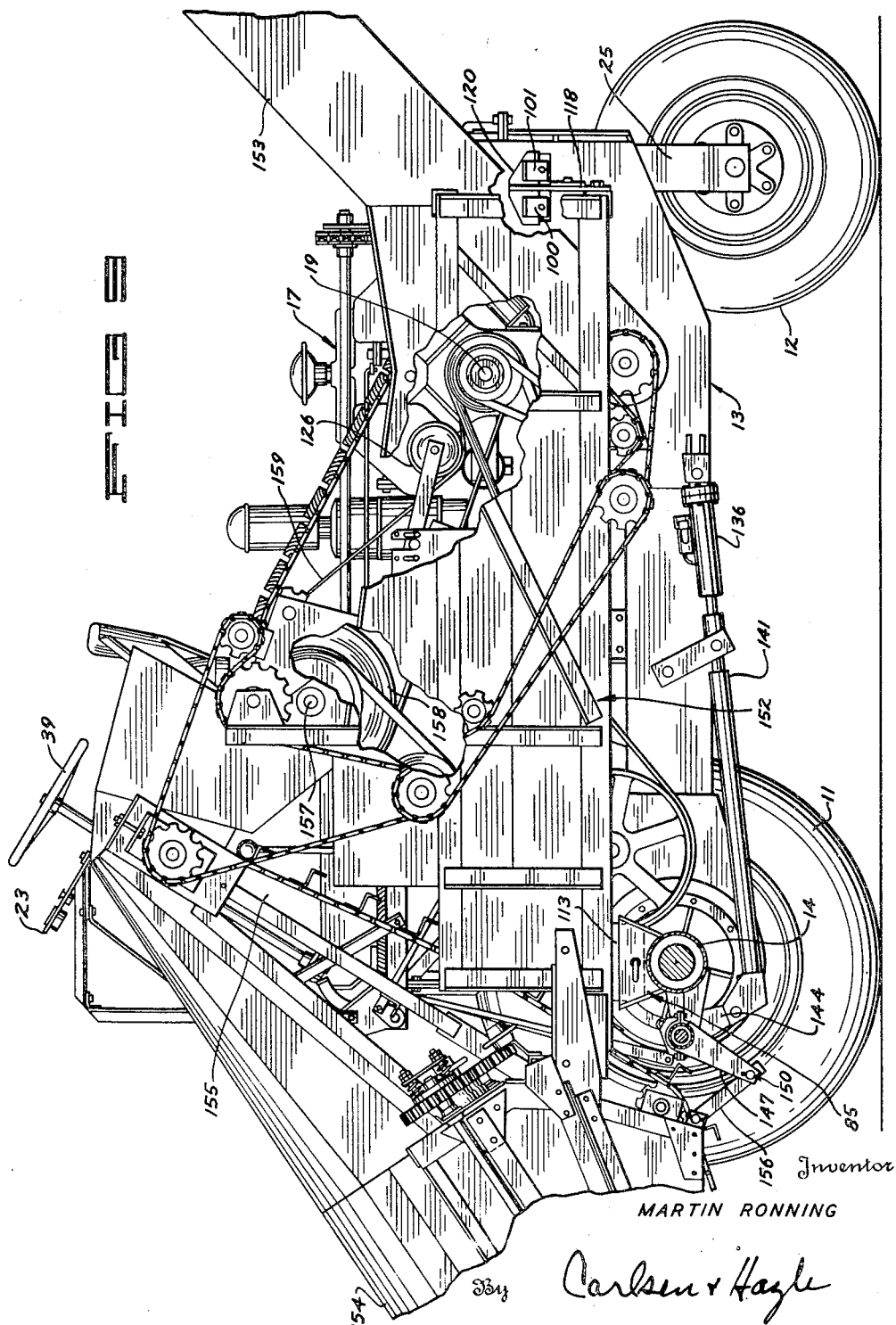

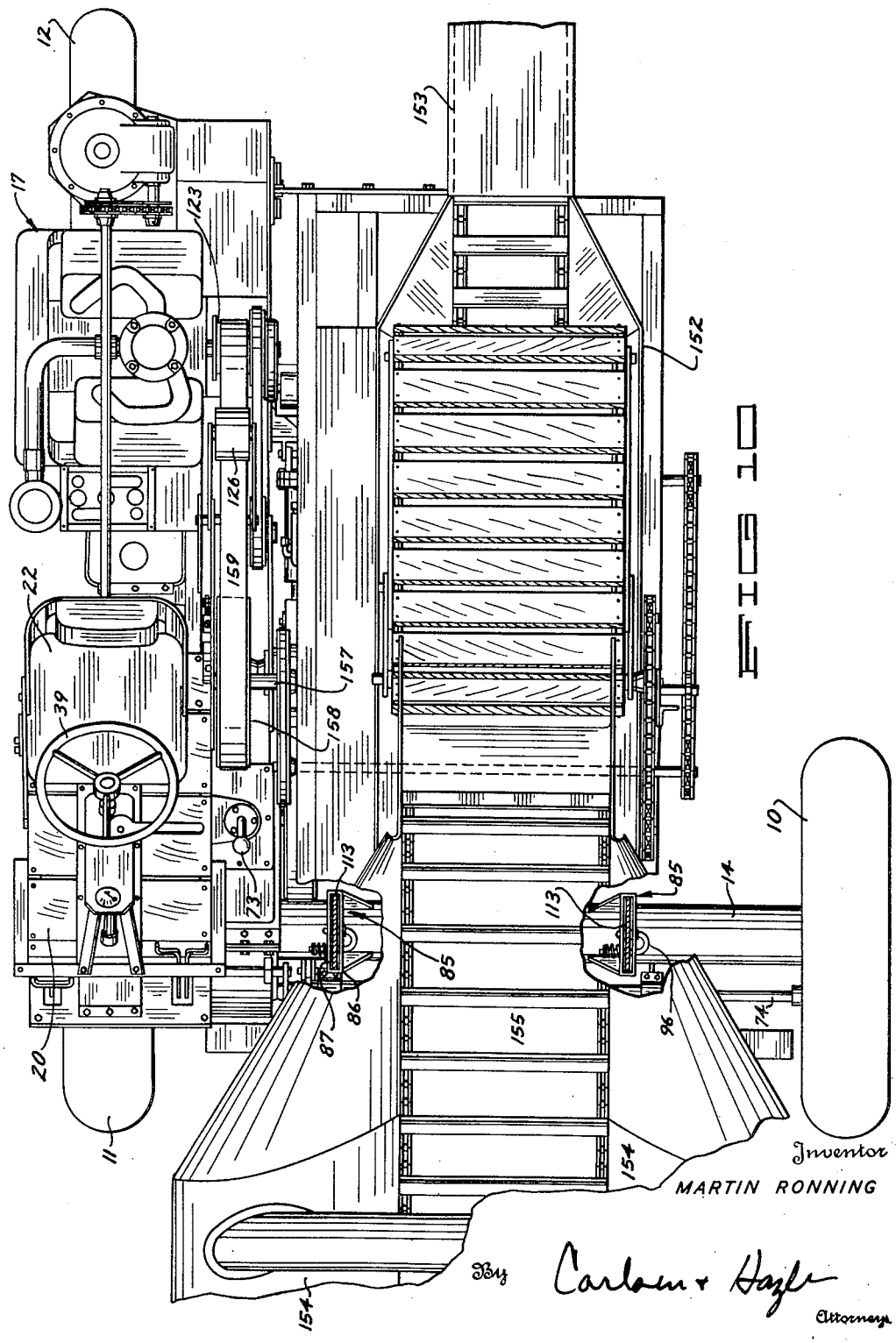

2,524,083

UNITED STATES PATENT OFFICE 2,524,083

TRACTOR AND MEANS FOR DETACHABLY MOUNTING AGRICULTURAL IMPLEMENTS THEREON

Martin Ronning, St. Louis Park, Minn., assignor, by mesne assignments, to Minneapolis-Moline Company, Hopkins, Minn., a corporation of Minnesota Application May 20, 1946, Serial No. 670,868

5 Claims. (Cl. 56—10)

My invention relates to improvements in self-propelled implements or tractors and implements and combinations thereof.

Such equipment is used in large quantities on the farm and there are many types both of tractors and of machines for use therewith. The present day method of mechanizing the farm, or equipping it with the machinery necessary for modern methods of farming, consists in the use of one or more tractors and a relatively great number of entirely separate and distinct implements or machines for carrying out the many operations of tilling, seeding and harvesting the various crops. Thus the well equipped farm will need a comparatively expensive and numerous collection of tillage tools, seeding equipment, haying tools, harvesting machines for grain, corn and the like as well as the usual accessory equipment of wagons and the like. The most representative as well as the usually most expensive units of such equipment are the combines for harvesting grain crops, and the huskers for harvesting corn from the field. Such machines, as well as most thus used on the farm, are each a complete entity having its own transport wheels and undercarriage, and hitch for attachment to the tractor, and each is adapted when put in use to be pulled by the tractor and in many cases powered thereby.

This manner of operation and set-up of farm machinery has numerous disadvantages from the practical standpoint although it is the established and accepted practice nowadays. In the first place, each machine, as stated, must be complete with supporting wheels etc. and have its own hitch connections and this is a needless and expensive duplication of parts since seldom are more than one type of machine in use at one time and that only when a number of tractors are available. Even in the latter case it is frequently found that needs for the tractors arise which cannot be filled while harvesting operations, for instance, are in progress and the equipment all in use. Another distinct disadvantage arises from this set-up of separate tractor-implement combinations due to the very fact that it is at best a compromise arrangement, making use of a general purpose tractor and the necessary auxiliary equipment on each implement to accommodate it to the tractor. For instance, an implement when connected to the tractor for draft purposes must trail behind the tractor for some distance resulting in a strung out or elongated assembly having a necessarily long turning radius and subject greatly to disturbances due to inequalities in the ground surface over which it travels.

It is the primary object of my invention to provide an entirely novel concept and radical advance in the construction, assembly and use of this general class of farm equipment. In the accomplishment of this object and in accordance with my invention I provide a tractor or automotive support which is designed for but one purpose, that of supporting and operating farm machinery, and implements designed particularly for mounting directly upon this tractor to be carried thereby, and powered by the power plant operating the tractor, if the nature of the implement requires it. At one stroke I thus eliminate the needless and expensive duplication of rolling stock or wheeled undercarriages for the various implements required on the farm and provide, in each tractor-implement combination, a compact, readily maneuvered and conveniently operated unit having a short turning radius. Another object of my invention is to provide a tractor-implement combination with simple and effective means for uniting the two, in a manner permitting convenient disassembly when required, and with the supporting points so located as to best distribute the load, facilitate maneuvering of the tractor and contribute to the overall efficiency of the combination.

Other important objects and advantages of my invention will appear in the course of the following detailed specification, reference being had therein to the accompanying drawing wherein:

Fig. 1 is a plan view of my special tractor forming part of the present invention.

Fig. 2 is an enlarged, fragmentary detail plan view showing one of the implement support and attachment means.

Fig. 3 is a front view of the tractor.

Fig. 4 is an enlarged vertical and longitudinal sectional view and fragmentary side elevation of the attachment means of Fig. 2, showing also a part of the cooperating element on the implement.

Fig. 5 is a side elevation of the tractor, the near traction wheel being removed and the axle shown in cross section.

Fig. 6 is a side view, partially broken away and in section, of a combine-tractor unit or assembly in accordance with my invention.

Fig. 7 is a front elevation, of the assembly of Fig. 6, viewed substantially along the line 7—7 in Fig. 6, or with the combine header and related parts omitted.

Fig. 8 is an enlarged detail rear end view along the line 8—8 in Fig. 6.

Fig. 9 is a side elevation also partly broken away and in section showing a tractor-husker unit or assembly for husking corn.

Fig. 10 is a plan view of the unit shown in Fig. 9, also with certain parts broken away and in cross section.

Referring now more particularly and by reference characters to the drawing, my improved and special tractor as shown in Figs. 1–5 will be first described. This machine forms the support and power source for the implements or machines later to be described, and in the sense that this unit actually supports and carries the implement, rather than drawing it along over the field in a trailing position, the unit is more strictly an automotive support or carrier. For convenience in description, however, it will be referred to in the main hereinafter merely as a tractor.

The tractor has wide spaced, transversely aligned front traction wheels 10 and 11 and a single, rearwardly located steerable wheel 12 located substantially in alignment with the right front wheel 11, looking toward the front of the tractor. Extending between the wheels 11 and 12 is a narrow elongated chassis or body structure indicated generally at 13 and appearing to best advantage in Fig. 5. The front wheels 10 and 11 are positioned at the extremities of a tubular dead axle or axle housing 14 within which are journaled live axle shafts 15 (see Fig. 5) connected to the wheels. In line with the chassis 13 is a transmission and differential housing 16 through which driving connection is made to the axles 15 and thence to the wheels 10 and 11 in a well known manner, said housing being connected to and forming the forward end part of the chassis 13 and being, of course, supported upon the axle 14.

The chassis or frame 13 may be fabricated in any suitable manner and is here shown as made up of suitably shaped plates welded into a rigid assembly. A power plant, such as an air cooled internal combustion engine 17 is supported near the rear end of the chassis upon a suitable bed plate 18 with its power shaft 19 extending toward the inner side of the chassis. Forwardly of the engine 17 and over the wheel 11 there is an operator's station having a platform 20 supported in an elevated position by a suitable framework 21, and upon the rear of which platform there is a seat 22. An instrument panel 23 is supported above the seat spaced forwardly therefrom, said panel being mounted in an inclined position upon a frame 24.

The rear wheel 12 is journaled at the lower end of an arm 25, the upper end of which is affixed to a vertical shaft 26 extending through a gear box 27. The gear box is secured at the rear of the chassis 13 and the box contains the usual worm gear and worm (not shown), the former being mounted on the shaft 26 and the latter on a shaft 29 which, when turned, rotates the shaft 26 and steers the wheel 12 to different steering angles. For operating the shaft 29 I provide it with a sprocket 30 over which is trained a sprocket chain 31 running over another sprocket 32 secured at the rear end of an elongated shaft 33. This shaft 33 is supported at its rear end in a bearing 34 secured to an upright plate 35 carried by chassis 13, and the shaft extends forwardly beneath the seat 22 over the platform 20. A bevel gear 36 is secured at the front end of the shaft 33 and meshes with a complementary gear 37 at the lower end of a steering shaft 38 which is surmounted by a steering wheel 39 located in a convenient position for operation by the operator seated on the seat 22. The upper part of the steering shaft 38 is supported through the instrument panel 23 and the lower end is journaled in a bracket 40 which also rotatably supports the forward end of shaft 33. It will be evident that the usual manipulation of the steering wheel will thus angle the wheel 12 as necessary for effecting steering movements of the tractor as a whole. A guard 41 encloses that part of the shaft 33 which passes over the platform 20.

The tractor is driven from the engine 17 by means of a V-belt 42 which is trained over a pulley 43 secured upon the drive shaft 19. This belt 42 runs also over one pulley 44 of a double variable-speed pulley unit, of conventional form, which is journaled upon a shaft 45. The shaft 45, positioned forwardly of the engine, is supported in hanger arms 46 journaled at their upper ends at 47 to side plates 48 on the chassis 13. Thus the pulley unit may be oscillated in a vertical, longitudinal plane with respect to the engine and chassis and for this purpose I affix to the shaft which connects the hanger arms 46 and acts as the pivot 47, a lever 49 to which the rear end of a link rod 50 is pivotally connected. The forward end of the link rod 50 is then pivotally connected to the lower end of a speed controlling hand lever 51 which is pivotally supported upon a shaft 52 alongside the platform 20 and projects upwardly along the right hand or outside of the seat 22. By moving the hand lever 51 back and forth, and this may be conveniently done by the operator on the seat 22, the arms 46 and pulley assembly may be moved as required or desired. Running in the other pulley 53 of the variable speed pulley unit is another V-belt 54 which operates also over a pulley 55 upon a main countershaft 56 journaled above the chassis in suitable bearings 57. The variable speed pulley is so arranged that forward movement of the hanger arms 46 will, through reactance of the belt 42, spread the two sides of pulley 44 allowing the effective belt diameter of this pulley to decrease and thus increasing the speed at which shaft 45 is driven with respect to shaft 19. At the same time the decrease in effective diameter at this point is accompanied by an increase in the effective belt diameter of the pulley 53 operating the belt 54, resulting in a multiplication of the speed at the shaft 56. Opposite movement of the pulley assembly will, of course, reverse this action. The hand lever 51 may have any usual friction or latching arrangement (not shown) to maintain any selected speed.

The countershaft 56 is also provided with a pulley 58 over which runs a flat belt 59 and this belt in turn is trained over a large drive pulley 60 upon a shaft 61 which leads into the transmission housing 16 and operates the change speed and drive gearing therein. Cooperating with the belt 59 is a belt tightener having spaced frame bars 62 fulcrumed intermediate their ends upon a shaft 63 supported above the belt. A small tightener pulley 64 is journaled between the rear ends of the frame bars 62 and a brake shoe 65 is secured between the forward ends of the bars over the pulley 60. Normally the bars 62 are swung downward at their rear ends, to bring the pulley 64 into tightening engagement with the belt 59, by a spring 66 upon a pull rod 67 attached at 68 to the bars. But the bars 62 may be swung upwardly at rear ends to slacken the belt 59 and simultaneously bring the brake shoe 65 into braking engagement with the belt where it runs over the pulley 60 and thus stop the transmission of power to the traction wheels 10 and 11. This is accomplished by a "clutch" pedal 69 supported upon a cross shaft 70 arranged below the forward edge of the platform 20. A lever 71 on one end of the shaft 70 is connected to bars 62 by a link 72 to the same point 68 as the spring rod 67. The pedal 69 is in convenient position for operation by one of the operator's feet when pressed down or forward will obviously move the pulley 64 away from the belt to "de-clutch" the drive between the engine and transmission housing 16.

The usual gear shift lever 73 is extended upwardly from the transmission 16 alongside the platform 20 and to a position convenient for operation from the seat 22.

The wheels 10 and 11 are provided with separate brakes (not shown) of any conventional form and for actuation thereof a long brake shaft 74 leads inward from the wheel 10 to the housing 16 and a much shorter brake shaft 75 is provided for the wheel 11, these shafts being located forwardly from the axle 14 and journaled in suitable bearings 76 on the transmission housing. Separate brake pedals 77—78 in the usual arrangement are independently pivotally mounted by sleeves 79—80 on the shaft 70 and are connected by brake rods 81 and 82 to the shafts 74—75. As here shown the rod 82 is connected directly through an arm 83 to the brake shaft 75 whereas brake rod 81 is connected through a short countershaft 84 and appropriate linkage to the shaft 74. The arrangement is obviously such that the two brake pedals 77—78 may be operated together to brake both wheels 10 and 11, or operated either alone to brake either wheel and facilitate steering in a well known manner.

Various auxiliary controls and equipment, such as gasoline tank, throttle and instruments on the panel 23, are provided but being not particularly material to my invention they are not described in detail herein.

Arranged in transversely spaced relation upon the axle 14 is a pair of implement or machine support and fastening means designated generally at 85. Each comprises upright side plates 86—87 welded or otherwise rigidly secured to the axle in upstanding transversely spaced relation forming narrow, longitudinally elongated sockets 88. The side plates 86—87 diverge at upper ends, as indicated at 89, so that the sockets 88 flare or are widened at their upper portions. End plates 90—91 are welded across the ends of the side plates and to the axle 14 to close the front and rear ends of the sockets 88 and to transversely brace the entire assembly these end plates are widened at lower ends where they meet the axle as clearly shown. The end plates 90—91 are also arranged in upwardly diverging relation so that the ends of the sockets also are angularly disposed and flare in upward directions. Latches or retainer members are provided for each fastening and support means 85 and each comprises a shank portion 92 which is slidably and rotatably positioned crosswise through the side plates 86—87 through suitable aligned openings 93 formed therein. The shanks 92 are each provided at one end with a collar or washer 94 between which and the adjacent side plate 86 an expansion coil spring 95 is braced to bias the latches in one direction, and at the opposite ends the shanks are bent back upon themselves forming finger hooks or loops 96 to the extremities of which are secured tapered fastening pins 97. The side plates 86—87 are apertured at 98 to receive these pins 97 and the springs 95 will normally pull the pins into these apertures so that the pins traverse the sockets 88 as clearly shown in Fig. 1. However, by hooking a finger through the finger hooks 96 as shown in Fig. 2, the pins 97 may be pulled out to clear the sockets 88 and by slightly turning the latches until the pins are out of registry with the apertures 98 the pins will be held in this position, as will be understood.

At its rear end and upon its inner side the chassis 13 includes an upright plate 99 upon which are secured a pair of fastening or support members or clips 100—101. These clips are fastened by bolts 102 upon a shim or spacer bar 103 which spaces them out from the plate 99 to form clefts or sockets 104 and at upper ends the clips are angled or bent inwardly in diverging relation with respect to the plate.

Referring now to Figs. 6, 7 and 8 more particularly, I disclose therein, as one example of a machine or implement for use on my tractor, a combine which, insofar as concerns its general arrangement of header, thresher, conveyors etc. is largely conventional in construction and arrangement. As here shown the combine is of the well known "straight-through" type having a comparatively narrow and elongated housing 105 containing the usual threshing elements, such as the cylinder, concave, beaters, grain pan, straw racks, sieves and the like, of which here only the forwardmost beater appears at 106 in Fig. 7. The rear end of the housing 105 terminates in a hood 107 from which the straw is discharged to the field, and over the housing is a grain tank 108 to which the cleaned grain is delivered by a conveyor 109. A tailings conveyor 110 returns any uncleaned grain to the cylinder for recirculation in usual manner and also, as usual in such machines, a header 111 is supported at the front end of the housing 105 and is arranged for up and down adjustments at its forward end to regulate the cutting height, this header having the usual sickle and conveyor mechanism not appearing herein.

It will be noted that this type of combine is well suited to use on any tractor since the housing 105 by its shape will fit nicely along the inner side of the tractor chassis 13 over the axle 14 while the header 111 projects forwardly ahead of the tractor. The housing 105 has any suitable lower framework or chassis frame 112 and at the forward end of this frame I provide depending supporting and connecting members or feet 113 adapted in width and length to fit nicely into the sockets 88 in the supports 85 on the tractor. The feet 113 are cross braced by gussets 114 (Fig. 7). In dropping the feet 113 into the sockets 88 the flaring side walls 86—87 will guide them to place and it will be noted that the front and rear lower corners of the feet are downwardly tapered or angled as indicated at 115 to correspond with the upwardly diverging ends of the sockets to give the feet a solid, wedging fit into the sockets. The lower edges of the feet 113 have downwardly opening notches 116 (Fig. 4) to clear the shank 92 of the latches and the feet further have openings 117, to the rear of the notches, through which the pins 97 may enter and wedge themselves when the latches are released and allowed to take the positions to which they are drawn by the springs 95. It will be seen now that the front end portion of the combine will be firmly supported upon the tractor axle 14 against displacement in any direction.

At the rear of the combine I provide a support hanger or plate 118 which is secured in an upright position to and upon a cross angle bar 119 forming part of the combine underframe 112. Upon the outer edge of this plate 118, or the edge toward the tractor chassis 13 I provide a hanger plate 120 secured rigidly in place and extending both forwardly and rearwardly of plate 118. The plate 120 is so positioned that it may slip down into the clefts 104 behind the clips 100—101 until it comes to rest upon the bar 103, the plate 118 falling or fitting in the space between the clips, all as best seen in Figs. 6 and 8. A latch button 121 is detachably mounted by a cap screw to the plate 118 and may be turned up beneath the clip 101 and fastened to hold the assembly together at this point.

The combine is powered from the tractor engine 17 by means of a flat belt 122 which is trained over a pulley 123 upon the engine shaft 19. The belt is then trained over a larger pulley 124 provided on the drive shaft 125 of the combine, said shaft extending toward and over the tractor chassis and placing pulley 124 in alignment with said pulley 123. A tightener pulley 126 for the belt 122 is provided and is journaled at the rear end of arms 127 (see Fig. 5 particularly) which are secured to a trunnion 128 journaled in and between the chassis plates 48 hereinbefore described. A hand lever 129 is pivoted at its rear end upon the trunnion 128 and extends upwardly and forwardly along the inner side of the platform 20 to a position convenient for operation from the seat 22. The hand lever 129 has a lug 130 (Fig. 5) slidable upon a pin 131 carried by the forward end of the arm 127 and a coil spring 132 is placed on the pin above the lug. The arrangement is such that, as the hand lever 129 is pulled up and back, the spring 132 will be compressive and the arms 127 rocked downward at its rear end forcing the pulley 126 down into tightening engagement with the belt 122 so that the combine drive shaft 125 and all parts connected thereto will be driven by engine 17. The hand lever is locked in such position by a detent 133 engaging a notch 134 in a quadrant 135 secured alongside the lever. The spring 132 places the tightening action under a spring tension and limits the force applied to the belt to prevent damage. Of course, as the hand lever 129 is pushed downwardly and forwardly the belt 122 is loosened to "de-clutch" the drive to the combine.

The combine header 111 may be power raised and lowered and for this purpose I provide a conventional power lift ram 136 on the inner side of the tractor chassis 13, and a hydraulic fluid supply pump 137 driven by a belt 138 from the engine 17, these parts being initially connected by fluid lines and with a control valve, all arranged in any well known manner and here omitted for the sake of clarity. The fluid actuated extensible and retractable element or plunger 139 of the ram 136 is attached at 140 to the rear end of a push rod or bar 141 which extends forwardly beneath the axle 14 and is pivotally supported at both front and rear ends for forward and rearward movements by the ram. The rear support for the push bar 141 is an arm 142 pivoted at 143 to the tractor chassis 13 and the forward support is a lever arm 144 which is secured to and depends from one end of a sleeve 145 which is journaled upon the brake shaft 74. This sleeve is journaled near each end in bearing brackets 146 rigidly supported from the axle 14 and two spaced cranks 147 are secured to the sleeve and extend forwardly and downwardly therefrom. Links 149 (Fig. 6) are detachably pivoted at 150 to the extremities of the cranks 147 and extend upwardly therefrom beneath the header 111 to which they are pivotally attached at 151. The lift arrangement is obviously such that the header 111 may be raised or lowered, as desired or required, by the ram 136, the sleeve 145 and cranks 147 being oscillated by the ram to thrust the links 149 upward or allow them to lower as the case may be.

As a further example of an implement or machine for use in connection with the tractor I show in Figs. 9 and 10 a tractor-husker unit or assembly wherein a corn husker, basically or so far as concerns its harvesting or snapping and husking mechanisms are concerned, of usual form, is supported upon the tractor. This unit comprises a bed frame or body 152 having the usual husking bed and conveyor assemblies and supporting a rearwardly directed elevator 153 for delivering the cleaned corn. Forwardly of the body 152 and pivoted thereto for up and down adjustments are the snouts 154 between which operate the usual gathering chains or snapping rolls, and which is surmounted by a conveyor 155 for delivering the harvested ears to the husking mechanism.

The husker has transversely spaced feet or support members 113 depending from the forward end of the body 152 and adapted to seat in the support members 85 on the axle 14 while at the rear end there are supported the plates 118 and 120 for engaging the clips 100 and 101, all exactly as previously described. The snouts 154 are supported by links 156 upon the cranks 147 also as previously described for the combine header, said links being again detachably pivoted at 150 to the cranks. Thus the snapping rolls and related parts may be vertically positioned as required.

The corn husker further has a drive shaft 157 and on the end thereof next to the tractor chassis a pulley 158 is provided for engagement by a belt 159 leading to and operated by the pulley 123 on the engine shaft 19. The belt tightener 126 also cooperates with this belt 159 to connect the husker to the engine 17 or "de-clutch" it therefrom as desired.

In use and operation it will be apparent that either the combine or the corn husker, or any other machine or implement appropriately arranged and constructed, may be lowered onto the tractor, and the feet 113 and hanger plate 120 respectively securely anchored in the support members 85 and clips 100—101. Then when the links 149 or 156 are connected to the lifting cranks 147 and the drive belts 122 or 159 placed over the pulleys as described the assembly is completed. To remove the machine from the tractor it is only necessary to actuate the latches to release the pins 97 from the feet 113, disengage and remove the button 121, disconnect the links 149 or 156 from the cranks 147 and throw off the belts 122 or 159 and the implement or machine may be lifted clear from the tractor and set aside for replacement by another. By the use of a suitable overhead hoist or crane arrangement (not here shown) this operation may be carried out with ease and in a very short time, particularly since the fastenings and drive connections to be made or unmade are few and simple as described. Thus the farmer needs but one automotive support or tractor and whatever implements or machines desired to meet most requirements about the farm and all at less expense than the usual system, particularly since the implements or machines have no expensive duplicated running gear, wheels and the like.

When the implement is upon the tractor it becomes to all intents and purposes an integral part thereof and the assembly is short, compact and practically as readily maneuverable as the tractor alone. Furthermore the operator, at his station is forwardly located, well above and right alongside the harvesting or gathering end of his machine where he may observe operations closely and has good forward vision. There is no occasion, as in the usual tractor and trailing implement combination, to be continually turning about to observe the operation of the implement.

Weight distribution of the implement is such that the majority of the load comes upon the front axle 14 and thence upon the traction wheels when needed and where it will interfere the least with steering ease. The three-point suspension of the implement on the tractor is accurate, self-leveling and eminently practical.

The tractor itself may be made quite light in weight and the weight necessary for efficient operation and traction provided by the implement or machine when in place on the tractor, thus effecting another saving. The infinite speed variations provided by the change speed transmission and variable speed pulley is of considerable advantage in adjusting the travel speed of the unit to suit various crop conditions.

I, of course, do not limit myself to tractor-combine or tractor-husker combinations as herein illustrated and described, but may employ on the tractor other equipment such as wagon boxes, haying tools, tillage equipment, seeding and planting machinery and the like.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A tractor, designed for selectively mounting and operating two or more interchangeable farm implements, comprising an elongated body extending longitudinally with respect to the direction of travel and including a power plant, a traction wheel supporting the forward end of the tractor body and a steering wheel supporting the rear end of the tractor body, said traction and steering wheels being disposed substantially in the central longitudinal vertical plane of the tractor body so as to form a balanced support therefore and so that the steering wheel will be in tracking alignment behind said tractor wheel, an axle housing extending rigidly and laterally from the front end of the tractor body to form a primary support for an implement mounted thereon to extend forwardly and rearwardly therefrom, a second traction wheel at the outer end of said axle housing and in substantial axial alignment with the first mentioned traction wheel, and means for detachably connecting and supporting the rear end of the implement to the tractor body at the steering wheel end thereof, said traction wheels being connected to be driven by the power plant so as to provide powered traction support for each side of the implement part extending forwardly from the axle housing.

2. A tractor for interchangeably supporting farm implements comprising a narrow body having an axle housing extending rigidly and laterally from the front end thereof, a pair of traction wheels, one at each end of the housing and with one of said wheels disposed directly under the front end of said body, a power plant on the body and connected with both traction wheels, a steering wheel at the rear end of the body and in tracking alignment behind the traction wheel at the front end thereof, said axle housing forming a primary support for an implement mounted thereon and extending forwardly and rearwardly therefrom, spaced means on the housing for attaching both sides of the implement thereto, and means near the steering wheel end of the tractor body for releasably securing the rear end of the implement thereto whereby the portion of the implement forward of the housing may be counterbalanced at least in part by the rear end of the implement and the tractor body to which it is attached.

3. In a tractor implement the combination including a tractor body proper extending longitudinally with respect to the direction of travel and including a power plant, an axle housing extending from the front end of the tractor body and laterally to one side thereof so as to form a primary implement support, an implement mounted on the axle housing and having a crop engaging portion disposed forwardly of the axle housing so as to engage crop material in advance of the tractor travel, the implement having a second portion extending rearwardly from the axle housing to at least partially counterbalance the crop engaging portion, and being attached to a rear point on the tractor body proper, a traction wheel at each end of the axle housing and connected to be driven by the power plant so as to furnish powered traction support for each side of the implement, and a steering wheel supporting the rear end of the tractor body proper and being disposed in longitudinal tracking alignment with the traction wheel at the forward end of such body.

4. An agricultural machine comprising, in combination, a tractor having a longitudinally extending body including a power plant, a traction wheel supporting the front end of the body, a steering wheel supporting the rear end of the body, said steering wheel being disposed in normal tracking alignment with the traction wheel, an axle structure extending rigidly from one side of the body in axial alignment with said traction wheel, a second traction wheel, at the outer end of said axle structure, driving connections from the power plant to both traction wheels whereby both ends of the axle structure will be power propelled, an implement mounted on the axle structure and having a vertically adjustable crop working portion extending forwardly therefrom so as to engage the crop in advance of travel movement by the tractor wheels, an operator's station on the forward portion of the tractor body, and controls extending to within reach of the operator at said station for operating the tractor, including the rearwardly disposed steering wheel, and for vertically adjusting the forwardly extended crop working portion of the implement.

5. A tractor for supporting a crop working implement to be carried coadunatively therewith comprising an elongated fore-and-aft extending body including a power plant and having an axle housing extending rigidly from one side thereof at its forward end, a pair of traction wheels, one at each end of the axle housing, and one of such traction wheels being disposed in the central longitudinal vertical plane of said tractor body, power transmitting connections from the power plant to said traction wheels including an axle extending through said housing to the other of said wheels, a steering wheel supporting the rear end of the tractor body and also being disposed in the central longitudinal vertical plane of said body whereby it will track directly behind the traction wheel at the forward end of the body, transversely spaced connecting devices extending from the axle housing for fastening an implement thereto with its crop working portion extending forwardly from the housing and in transversely centered position with respect to the tractor wheels, and means at the rear end of the tractor for releasably attaching the rear end of the implement thereto.

MARTIN RONNING.

REFERENCES CITED

The following references are of record in the file of this patent:

UNITED STATES PATENTS

| Number | Name | Date |
|---|---|---|
| 1,222,557 | McFarland et al. | Apr. 10, 1917 |
| 1,263,001 | Swofford | Apr. 16, 1918 |
| 1,972,680 | Cushman | Sept. 4, 1934 |
| 2,264,565 | Coultas et al. | Dec. 2, 1941 |
| 2,310,577 | Everett | Feb. 9, 1943 |
| 2,366,408 | Jenson | Jan. 2, 1945 |
| 2,376,539 | Hitchcock et al. | May 22, 1945 |
| 2,413,873 | Hume | Jan. 7, 1947 |